Figure 1:
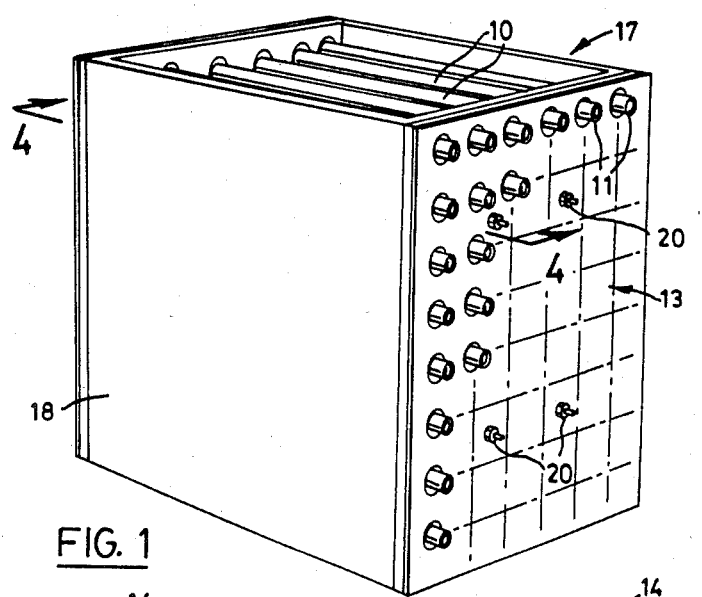

United States Patent [19]

Kerr et al.

[11] Patent Number: 4,578,850
[45] Date of Patent: Apr. 1, 1986

[54] METHOD OF MANUFACTURING A HEAT EXCHANGER

[75] Inventors: Norman S. Kerr, Agincourt; William D. Cain, Richmond Hill, both of Canada

[73] Assignee: Danhart Energy Systems Limited, Richmond Hill, Canada

[21] Appl. No.: 540,883

[22] Filed: Oct. 11, 1983

[30] Foreign Application Priority Data

Nov. 3, 1982 [CA] Canada ............................. 414774

[51] Int. Cl.$^4$ ............................................. B23P 15/26
[52] U.S. Cl. .......................... 29/157.3 R; 29/157.3 C; 29/450; 165/158; 165/175; 403/240
[58] Field of Search ....................... 165/158, 173, 175; 29/450, 157.3 R, 436, 455 R, 157.3 C; 72/702; 403/186, 240, 345

[56] References Cited

U.S. PATENT DOCUMENTS

| | | |
|---|---|---|
| 1,575,497 | 3/1926 | Meschke . |
| 2,196,683 | 4/1940 | Pickstone . |
| 2,225,856 | 12/1940 | Buck . |
| 2,969,956 | 1/1961 | Forgo . |
| 3,081,102 | 3/1963 | Murray et al. ................ 29/450 X |
| 3,422,884 | 1/1969 | Otten . |
| 3,471,178 | 10/1969 | Roe . |
| 3,739,840 | 1/1973 | Jones . |
| 4,073,048 | 2/1978 | Ditcher ................ 29/450 |
| 4,159,035 | 6/1979 | Chartet . |
| 4,328,862 | 5/1982 | Gossalter ................ 165/158 |
| 4,373,580 | 2/1983 | Gossalter ................ 165/173 |
| 4,421,160 | 12/1983 | Stafford et al. ................ 165/158 X |

FOREIGN PATENT DOCUMENTS

| | | | |
|---|---|---|---|
| 191441 | 10/1956 | Austria ................ | 165/173 |
| 1434754 | 5/1976 | United Kingdom ................ | 165/158 |
| 463852 | 2/1975 | U.S.S.R. ................ | 165/173 |

Primary Examiner—Carl E. Hall
Attorney, Agent, or Firm—Ridout & Maybee

[57] ABSTRACT

In order to provide a simple and expeditious method of manufacturing a heat exchanger which comprises a plurality of heat exchange tubes in substantially parallel, spaced apart stacked relationship, with the end portions of each heat exchange tube being sealingly disposed through a respective pair of aligned apertures in two spaced end walls, the end portions of each heat exchange tube are urged in one direction through the apertures in resiliently deformable plates of the end walls, the end portions of the tube being an interference fit in these apertures in the resiliently deformable plates so that the edge portions of the resiliently deformable plates bounding the apertures therein are resiliently deformed. Thereafter, each heat exchange tube is moved in the opposite direction to remove the resilient deformation of the edge portions of the resiliently deformable plates bounding the apertures therein, thereby sealingly to compress these edge portions of the resiliently deformable plates against the end portions of the tube. The resiliently deformable plate of each end wall may be sandwiched between two metal plates which may subsequently be urged together thereby to further compress the resiliently deformable plates of the end walls against the end portions of the heat exchange tubes.

6 Claims, 4 Drawing Figures

METHOD OF MANUFACTURING A HEAT EXCHANGER

This invention is concerned with a method of manufacturing a heat exchanger which is of the type comprising a plurality of substantially parallel, spaced apart heat exchange tubes disposed in stacked relationship, and two spaced end walls having apertures provided therethrough, with each aperture in each end wall being in alignment with one of the apertures in the other end wall, and the end portions of each heat exchange tube being sealingly disposed through a respective pair of aligned apertures in the end walls. Heat exchangers of this general type are well known in the art, a first fluid operatively flowing through the heat exchange tubes and a second fluid operatively flowing in a direction substantially at right angles to the direction of flow of the first fluid around and between the heat exchange tubes, with heat being transferred through the walls of the heat exchange tubes between the two fluid flows. Thus, for example, hot exhaust gases may operatively flow around and between the heat exchange tubes with a supply of clean air operatively flowing through the heat exchange tubes, this supply of clean air being heated by heat transferred through the walls of the heat exchange tubes from the hot exhaust gases.

In heat exchangers of the above-described type the heat exchange tubes and the end walls may be of different materials having different coefficients of thermal expansion and it is a primary object of the present invention to provide a method of manufacturing a heat exchanger of the above-described type in which at least one end portion of at least one of the heat exchange tubes is sealingly disposed through the associated aperture in the associated end wall in simple and expeditious manner which, when the heat exchanger is subsequently in use, accommodates such differential thermal expansion while said sealed disposition of the end portion of the heat exchange tube remains intact.

According to the present invention in a method of manufacturing a heat exchanger of the above-described type the disposing of at least one of the end portions of at least one of the heat exchange tubes through the associated aperture in the associated end wall which comprises a plate of resiliently deformable material, comprises the steps of relatively moving said heat exchange tube and said associated end wall in one direction to urge said end portion of said heat exchange tube as an interference fit through said associated aperture in the resiliently deformable plate of said associated end wall thereby resiliently to deform to one side of the plane of said resiliently deformable plate edge portions of said plate bounding said aperture, and then relatively moving said heat exchange tube and said associated end wall in the opposite direction to remove said resilient deformation to said one side of the plane of said resiliently deformable plate of the edge portions of said plate bounding said aperture, with resultant compression of the edge portions of the resiliently deformable plate bounding said aperture against said end portion of said heat exchange tube.

Figure 2:
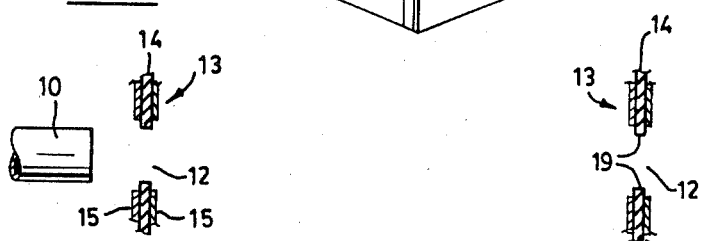
Figure 3:
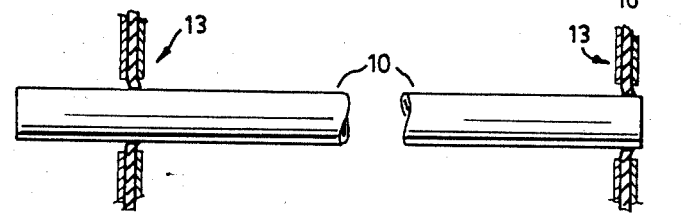
Figure 4:
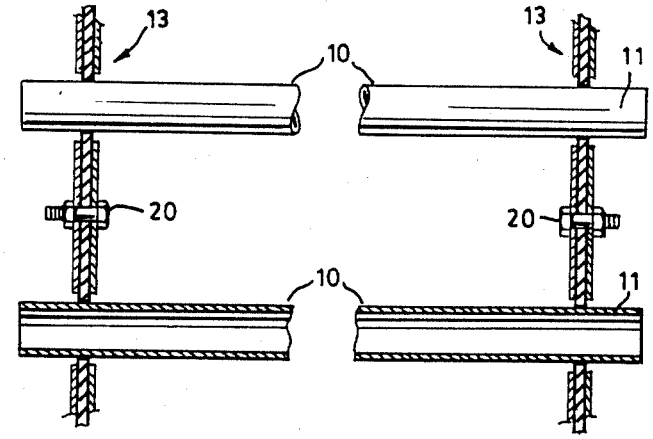

In order that the invention may be more clearly understood and more readily carried into effect the same will now, by way of example, be more fully described with reference to the accompanying drawing in which FIG. 1 is a perspective view of a heat exchanger manufactured by a method according to a preferred embodiment of the invention; and FIGS. 2, 3 and 4 are sectioned views showing progressive steps in the method according to said preferred embodiment of the invention, FIG. 4 being on the section line 4—4 in FIG. 1.

Referring to the drawing, and particularly to FIG. 1 thereof, 10 denotes each of a plurality of substantially parallel, spaced apart heat exchange tubes which may be of, for example, glass which renders the tubes 10 wear and corrosion resistant and also easily cleaned, the tubes 10 being disposed in a stacked relationship preferably comprising a plurality of horizontal rows of the tubes 10 with the tubes 10 of the rows thereof being vertically aligned. The end portions 11 of each tube 10 are sealingly disposed through a pair of aligned apertures 12 provided in two spaced end walls 13 which are preferably parallel to one another, each end wall 13 comprising a plate 14 of resiliently deformable material such as, for example, silicone rubber, and preferably also comprising two spaced, rigid plates 15 of, for example, metal between which the resiliently deformable plate 14 is sandwiched, with each heat exchange tube 10 being a clearance fit through apertures 12 in the metal plates 15 of each end wall 13. The faces of the resiliently deformable plate 14 of each end wall 13 which are contacted by the metal plates 15 may each be coated with a layer 16 of polytetrafluoroethylene, such as that marketed under the trade mark TEFLON. The tubes 10 and the end walls 13 are preferably mounted within a frame 17 which may be of sheet metal form and which includes side walls 18.

With particular reference to FIGS. 2, 3 and 4, each tube 10 is disposed through the associated pair of aligned apertures 12 in the end walls 13 by relative movement between the tube 10 and the end walls 13 in one direction i.e. by for example movement of the tube 10 relative to the walls 13 to the right as viewed in FIG. 2. The tube 10 is an interference fit in the apertures 12 in the resiliently deformable plates 14 of the end walls 13, so that therefore the tube 10 resiliently deforms to the right-hand side of the planes of the resiliently deformable plates 14 the edge portions of the plates 14 bounding the apertures 12 therethrough (FIG. 3).

Thereafter, by relative movement between the tube 10 and the end walls 13 in the opposite direction i.e. by for example movement of the tube 10 relative to the walls 13 to the left, the above-described resilient deformation to the right-hand side of the planes of the resiliently deformable plates 14 of the edge portions of the plates 14 bounding the apertures 12 therethrough is removed (FIG. 4). This results in compression of these edge portions of the resiliently deformable plates 14 of the end walls 13 against the end portions 11 of the tube 10, thereby sealingly to dispose the end portions 11 of the tube 10 through the end walls 13.

Each aperture 12 through the resiliently deformable plate 14 of each end wall 13 may, prior to the disposition of the end portions 11 of the tubes 10 through the apertures 12 in the end walls 13 as hereinbefore described with reference to FIGS. 2, 3 and 4, be provided with a liquid silicone coating 19 which substantially sets, thereby more securely to seal the end portions 11 of each tube 10 to the end walls 13. Furthermore, the metal plates 15 of each end wall 13 may be interconnected by, for example, one or more nut and bolt assemblies 20 by means of which the metal plates 15 of each end wall 13 may, subsequent to the above-described disposition of the end portions 11 of the tubes 10 through the apertures 12 in the end walls 13, be urged together to compress the resiliently deformable plate 14 of each end wall 13 between the metal plates 15 thereof and thereby further sealingly secure the end portions 11 of each tube 10 to the end walls 13.

When the heat exchanger is operatively in use a first fluid flows through the tubes 10 while a second fluid flows around and between the tubes 10 in a direction generally at right angles to the direction of flow of the first fluid, heat being transferred between the first and second fluids through the walls of the tubes 10. Preferably, the second fluid is the relatively hot fluid such as a supply of hot exhaust gases, while the first fluid which flows through the tubes 10 is the relatively cold fluid such as a supply of clean air to be heated by heat from the hot exhaust gases, the above-described sealed disposition of the end portions 11 of the heat exchange tubes 10 through the apertures 12 in the end walls 13 accommodating operative differential thermal expansion between the glass tubes 10 and the end walls 13 while this sealed disposition of the end portions 11 of the tubes 10 remains intact.

It will of course be appreciated that in use a plurality of heat exchangers as hereinbefore described with reference to the accompanying drawing may operatively be disposed in stacked or side-by-side relationship. In this case, the first fluid may, if desired, be caused to flow in one direction through the tubes 10 of one or more of the heat exchangers to a header unit and then in the opposite direction through the tubes 10 of the remaining heat exchanger or exchangers, while the second fluid flows around and between the tubes 10 of said one or more heat exchangers and then around and between the tubes 10 of said remaining heat exchanger or exchangers.

While as hereinbefore described with reference to the accompanying drawing, both end portions 11 of all the heat exchange tubes 10 are sealingly disposed through the apertures 12 in the end walls 13 by the method hereinbefore described with particular reference to FIGS. 2 through 4, it is to be understood that in a method according to the present invention only one or more of the end portions 11 of the tubes 10 may be sealingly disposed through the associated apertures 12 in the end walls 13 in this manner, with the remaining end portions 11 of the tubes 10 being sealingly disposed through the associated apertures 12 in the end walls 13 in a different manner which may be conventional.

We claim:

1. A method of manufacturing a heat exchanger comprised of a plurality of heat exchange tubes disposed in substantially parallel spaced apart stacked relationship, with end portions of each heat exchange tube being sealingly disposed through a respective pair of aligned apertures in two spaced end walls, wherein the disposing of at least one of the end portions of at least one of the heat exchange tubes through the associated aperture in the associated end wall defined at least by a plate of resiliently deformable material disposed in a plane, comprising the steps of:

(a) providing an end wall having an aperture defining an interference fit for insertion of the heat exchange tube therethrough;
    (b) moving the tube relative to the end wall in one direction to insert the end portion of the tube through the aperture whereby the interference fit causes compression of the edge portions of the aperture against the end portion of the tube;
    (c) deforming the edge portions of the aperture outside of the plane of the end wall to one side thereof; and
    (d) moving the tube relative to the end wall in the opposite direction to restore the deformed edge portions back within the plane of the end wall and radially compress the edge portions against the end portion of the tube to form a seal therebetween.

2. A method of manufacturing a heat exchanger comprised of a plurality of heat exchange tubes disposed in substantially parallel spaced apart stacked relationship, with end portions of each heat exchange tube being sealingly disposed through a respective pair of aligned apertures in two spaced end walls, each of which is defined at least by a plate of resiliently deformable material disposed in a plane, comprising the steps of:

(a) providing a pair of end walls, each end wall having an aperture aligned with the aperture of the other end wall and defining an interference fit for insertion of the heat exchange tube therethrough;
    (b) moving the tube relative to the end walls in one direction to insert the end portions of the tubes through the apertures whereby the interference fit of each aperture causes compression of the edge portions of the aperture against each end portion of the tube;
    (c) deforming the edge portions of each aperture outside of the plane of its end wall to one side thereof; and
    (d) moving the tube relative to the end walls in the opposite direction to restore the deformed edge portions back within the plane of each end wall and radially compress the edge portions of each aperture against its corresponding end portion of the tube to form a seal therebetween.

3. A method according to claim 2, wherein each end wall further comprises two spaced, rigid plates between which the resiliently deformable plate of the end wall is sandwiched, the end portions of each heat exchange tube being a clearance fit through the apertures in the rigid plates, and the method further comprising urging together the rigid plates of each end wall, subsequent to said movement of each heat exchange tube in said opposite direction, thereby to further compress the resiliently deformable plate of the end wall between the rigid plates thereof.

4. A method according to claim 2, wherein each aperture through the resiliently deformable plate of each end wall has a liquid silicone coating.

5. A method according to claim 2, wherein the resiliently deformable plate of each end wall is coated with polytetrafluoroethylene.

6. A method according to claim 2, wherein the resiliently deformable plate of each end wall is of silicone rubber.

* * * * *